Dec. 25, 1956 G. A. CURTIS 2,775,729
REVERSING CONTROL DEVICE FOR ELECTRIC MOTORS
Filed May 4, 1954 4 Sheets-Sheet 1
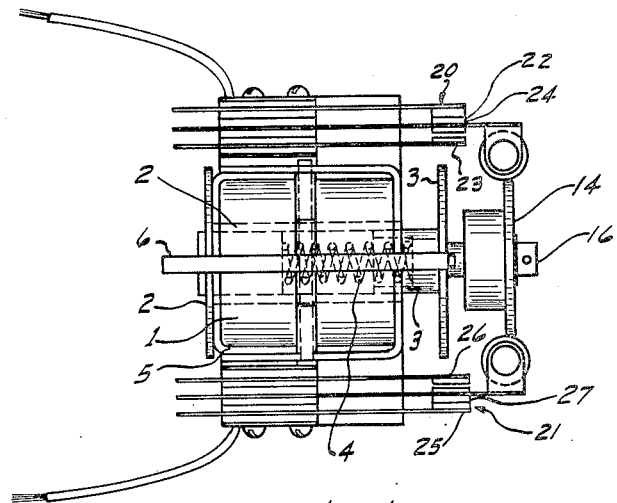
Fig. 1
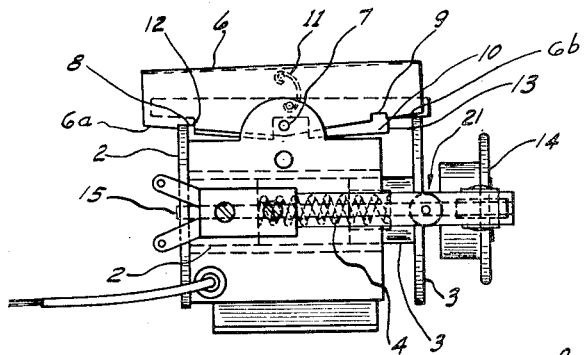
Fig. 2
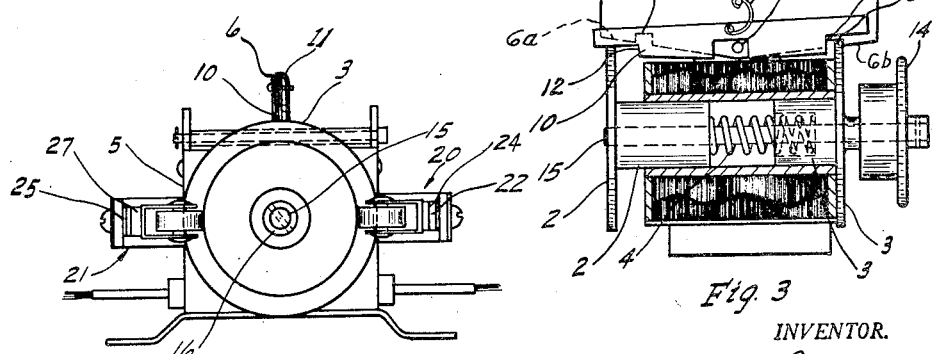
Fig. 3
Fig. 4
INVENTOR.
Guy A. Curtis,
BY Geher & Leonard,
his ATTORNEYS.

Dec. 25, 1956  G. A. CURTIS  2,775,729
REVERSING CONTROL DEVICE FOR ELECTRIC MOTORS
Filed May 4, 1954  4 Sheets-Sheet 2

INVENTOR.
Guy A. Curtis,
BY
Gebert & Leonard,
his ATTORNEYS.

Dec. 25, 1956  G. A. CURTIS  2,775,729
REVERSING CONTROL DEVICE FOR ELECTRIC MOTORS
Filed May 4, 1954  4 Sheets-Sheet 4

INVENTOR.
Guy A. Curtis,
BY
Geber & Leonard S.
ATTORNEYS.

United States Patent Office 2,775,729
Patented Dec. 25, 1956

2,775,729

REVERSING CONTROL DEVICE FOR ELECTRIC MOTORS

Guy A. Curtis, Cleveland Heights, Ohio

Application May 4, 1954, Serial No. 427,462

16 Claims. (Cl. 318—207)

This invention relates to a selective control device for causing different operations of an apparatus in predetermined sequences upon successive actuations of the device, and in a combination of the device with power driven apparatus such that upon successive operations of the apparatus the apparatus is caused to operate alternately in opposite directions.

For the purposes of illustration the invention is disclosed as embodied in a solenoid operated device for reversing, in alternate sequence upon successive actuations of the device, the closing positions of a double throw electric switch which is connected to a motor having an operating winding and a starting winding so as to reverse the motor consequent on reversal of the closed position of the double throw switch, the device being electrically connected in a circuit with the motor for energization each time one of the windings is energized.

The device comprises essentially a movable mechanism having members which are movable from one non-operating position to two different relative positions which are different operating positions, and includes a latch and a settable device which is set by at least one of the movable members each time the movable members move to said non-operating position from either one of the relative positions so as to shift the latch and thereby constrain the movable members from movement to the one of the operating positions from which it had moved for operating the latch and to permit them to move to the other one of said relative positions.

More particularly, the device comprises a mechanism having two movable actuating members which are movable into one position with respect to each other and which, when they are so moved, operate a settable device which constrains one of the members to move to an operating position when it is released from the one position and constrains the other member from movement to an operating position, and which, when they are moved again to said one position, operate the settable device which then constrains the other member to move to a different operating position from the first one when it is released from the said one position and constrains said one member from movement to its operating position, so that the movable members upon one movement to said one position, constrains one of the members to remain out of its operating position and release the other member for movement to its operating position, and the next time they move to said one position, reverse the relation of the members as to their operating position.

Other specific objects and advantages of the device will become apparent from the following description in which reference is made to the drawings, in which:

Figure 1 is a top plan view of a selecting device embodying the principals of the present invention;

Figure 2 is a front elevation of the device illustrated in Figure 1;

Figure 3 is a front elevation, partly in section, of the device illustrated in Figure 1, showing a different operating position thereof;

Figure 4 is a right end elevation of the device illustrated in Figure 1;

Figure 5:
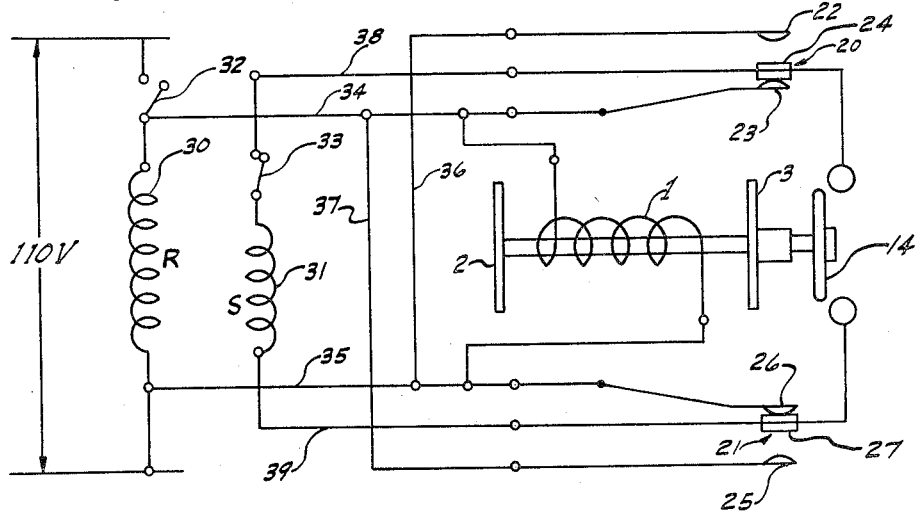
Figure 5 is a wiring diagram showing one application of the device.

Referring to the drawings, the device comprises a power applying member which, in the form illustrated, is a solenoid coil 1. A pair of movable actuating members in the form of movable cores or plungers 2 and 3, respectively, are arranged in opposite ends of the coil 1 for movement in coaxial relation thereto independently of each other and for movement relative to each other.

The preferred form of the invention is illustrated in Figure 1 and therein the plungers 2 and 3 are movable relatively toward each other by energization of the coil 1 and are yieldably urged relatively apart by return resilient means or spring 4.

The coil 1 is mounted on a suitable frame or support 5. A latching mechanism, in the form of a rocking beam 6, is supported on the frame and preferably extends generally lengthwise of the axis of the coil so as to be directly cooperable near its ends with the plungers 2 and 3, respectively. The beam 6 is mounted on a pivot 7 for rocking movement. At one end it has a latching shoulder 8 and at the opposite end a latching shoulder 9. The shoulder 8 is so arranged that when the rocking beam 6 is depressed while the plunger 2 is in the inward or retracted position illustrated in Figure 2, the shoulder can engage a portion of the plunger and restrain it from movement from the retracted position in Figure 2 to an extended position. The shoulder 9 at the opposite end of the beam 6 is correspondingly so arranged that when the corresponding end of the beam 6 is depressed while the plunger 3 is in retracted position, the shoulder 9 can engage and latch the plunger 3 in retracted position.

The shoulders 8 and 9 are so positioned on the beam relative to each other that when either one is in latching relation to its associated plunger, the other one is in releasing position to its associated plunger. Thus, upon rocking the beam from one extreme position in which one of the plungers is latched and the other released to the other extreme position, the latched plunger is thereby released and the released plunger is thereby latched.

It is desirable for a number of applications and uses of the device that the latching and releasing of the plungers be alternated with respect to each other for successive movements of the plungers relatively toward each other to retracted position and settable means, which are operated by the plungers for operating the beam in the proper sequence to maintain these relations, are provided.

In the form illustrated, the settable means comprises a settable element 10 which is mounted for floating movement relative to the beam 6 both endwise of the beam and transversely of the beam. The element 10 is normally urged by a dead center C-spring or other suitable resilient means 11 in a direction transversely of the beam 6 in all relative positions of the beam and element 10. The element 10 is provided at its opposite ends with shoulders 12 and 13, respectively. The element 10 is held in positions by the spring 11 such that each of the shoulders 12 and 13 is in the path of movement of its associated one of the plungers 2 and 3 when its associated plunger is moving to the retracted position.

For example, referring to Figure 2, the element 10 is held by the spring 11 with the shoulder 13 exposed outwardly from the beam 6 and in a position to be engaged by the unlatched one of the plungers 3 when the plunger 3 is moved to the left or retracted position. Upon movement of the plunger 3 to the left, it engages the shoulder 13 and moves the element 10 generally lengthwise of the beam 6 while the element is being urged toward the coil or transversely of the beam by the spring 11. The coaction of the force applied against the shoulder 13 endwise of the element 10 and the force applied by spring 11 transversely of the element 10 causes the element 10 to move toward the left end of the beam 6 and concurrently to tilt and move upwardly slightly at its left end and so that a surface or edge thereof, such as that exposed toward the coil 1, can engage some other part of the device, such as the edge of the plunger 2 or the frame 5, and thus with a camming effect, move the element 10 farther away from the shoulder edge of the beam 6. This movement of the element increases the pressure on the spring 11 which, since the element 10 has been moved to carry its connection with the spring to the opposite side of dead center relative to the connection of the spring 11 with the beam 6, urges the beam to rock out of latching relation with the plunger 2, in a clockwise direction in Figure 2. This action releases the shoulder 8 from the plunger 2 and moves the shoulder 9 into latching relation to the plunger 3.

It is desirable to prevent the rocking of the beam 6 until the unlatched one of the plungers, such as 3 in the position shown in Figure 2, is moved fully to its retracted position there shown.

To accomplish this, the beam 6 has portions 6a and 6b extending toward the outer ends beyond the shoulders 8 and 9, respectively. These portions 6a and 6b alternately ride on the plungers 2 and 3 until both plungers are fully retracted, making it impossible to release or latch both plungers at the same time.

Thus, upon energization of the coil 1, the plunger 2 moves very slightly to fully retracted position, as the case may be, and the plunger 3 also moves to fully retracted position. These actions, through the medium of the element 10, causes engagement of the unlatched plunger 3 against the shoulder 13, moves the element 10 so that the element 10 and its spring 11 rock the beam 6 and causes it to release the plunger 2 and latch the plunger 3.

When the coil is deenergized, therefore, the plunger 3 being latched, the return spring 4 moves the plunger 2 to the extended position, meanwhile forcing the plunger 3 tightly against the latching shoulder 9. Consequently, at the end of the second operation, the plunger 2 is free and in extended position and the plunger 3 latched and in retracted position.

If the coil 1 is again energized, the operation is repeated by means of the plunger 2 engaging the shoulder 12 of the element 10 so as to restore the various parts to their original positions illustrated in Figure 2.

Thus, for each succeeding cycle of operation, including energization and deenergization, of the coil 1, a different one of the plungers 2 and 3 moves to its extended position and the other becomes latched in its retracted position.

If the extended positions generally are to be the operating positions, the movement of the plungers 2 and 3 into their respective operating positions are alternated with respect to successive cycles of operation of the coil.

In order that a mechanism to be controlled can be operated alternately in accordance with the movement of the plungers 2 and 3 into operating positions, an actuator 14 is provided and is connected to the plungers, preferably by a lost motion connection.

A suitable lost motion connection may comprise a rod 15 fixedly connected to the plunger 2 and movable axially relatively to the plunger 3. The rod 15 extends entirely through the plunger 3 and at its outer end is provided with a suitable abutment or stop 16, which is arranged in spaced relation to the outer end face of the plunger 3.

The actuator 14 is slidably mounted on the rod 15 between the outer end face of the plunger 3 and the inner end face of the stop 16 and is of less length than the distance between said faces. Its length is related both to this distance and the distance of travel of the plungers 2 and 3. Thus, when the plunger 3 moves to extended postion, it engages and moves the actuator 14 in the same direction and when the plunger 3 is retracted from extended position, it leaves the actuator free to move in the opposite direction. When the plunger 2 moves to extended position it moves the rod 15 to the left in Figure 2 and thereby causes the engagement of the stop 16 with the actuator 14 and moves the actuator 14 in a direction opposite from that in which it was moved by the plunger 3. When the plunger 2 moves to retracted position, it frees the stop 16 from the actuator 14 and leaves the actuator free to move to the right in Figure 2.

As mentioned, for purposes of illustration, the device is shown for selecting the direction of operation in which a reversible motor is to be operated and for this purpose, employs one or more double throw switches.

In the form illustrated in Figures 1 and 2, two double throw switch components are provided and are indicated generally at 20 and 21. The switch component 20 has stationary contacts 22 and 23 and a movable contact 24. These contacts are arranged so that upon movement of the contact 24 to one position, it makes contact with contact 23 and breaks contact with the contact 22 and when moved to an opposite position, breaks contact with the contact 23 and makes contact with the contact 22. Thus, except during the instant of operation, the circuit through the switch component 20 is completed either through the contact 23 or the contact 22. The switch component 21 has stationary contacts 25 and 26 and a movable contact 27. It is arranged so that in one position, the movable contact 27 makes contact with the contact 26 and breaks contact with the contact 25 and when in the opposite position, it makes contact with the contact 25 and breaks contact with the contact 26. The contacts 23 and 24 are normally closed as also are the contacts 26 and 27.

The switch components are arranged so that the actuator 14 is at the left in Figures 1 and 2 when the plunger 2 is extended. When the actuator 14 is at the left, the contacts 23 and 24 and contacts 26 and 27 are closed. When the plunger 3 is extended. the actuator 14 is to the right in Figures 1 and 2, and the normally closed contacts are open and contacts are established through contacts 22 and 24 and through contacts 25 and 27.

It is apparent, therefore, that upon successive operations of the coil 1 in cycles, each of which includes energization and deenergization of the coil, the switch components 20 and 21 are operated to make two different connections, these connections alternating with respect to successive cycles.

Referring next to Figure 5, a wiring diagram of the selection device combined with a reversible electric motor is illustrated.

In this combination, the motor is one employing a running winding 30 and a starting winding 31, the winding 30 being connected across the usual power source by a suitable manual switch 32 and the starting winding being connected in series with the usual centrifugal cut-out switch 33 which is arranged to open the circuit to the starting winding 31 when the motor accelerates to running speed.

The coil 1 is connected in parallel with the running winding 30 and this parallel connection is in series with the switch 32 so that upon opening of the switch 32, both the running winding 30 and the coil 1 are deenergized.

These connections to the terminals of the coil 1 are through conductors 34 and 35. The contacts 23 and 26 also are tapped into these conductors between the coil 1 and the source. Conductor 35 is also connected by conductor 36 to contact 22 and the conductor 34 is connected by conductor 37 to the contact 25. As mentioned, one terminal of the starting coil 31 is connected in series with one terminal of the centrifugal switch 33. The other terminal of the switch 33 is connected to the contact 24 by a conductor 38. The other terminal of the starting coil 31 is connected to the movable contact 27 by a conductor 39.

The starting winding is one of those quite often used in reversible fractional horsepower motors and adjusted so that when its connections across the source of power are reversed, it starts the motor in correspondingly reversed directions. Such starting windings or mechanisms are well known and the specific structure thereof forms no part of the present invention.

The circuit above described is one in which the motor is to be reversed each time the switch 32 is opened and then reclosed, the switch 32 being a push-button switch if the device is to be operated intermittently at the choice of an operator.

Let it be assumed that the motor 8 is stopped, the switch 32 is open, the contacts 23 and 24, and also the contacts 26 and 27, are in their normally closed positions. Since the motor is stopped, the centrifugal switch 33 is closed.

Upon closing switch 32, the running winding 30 is energized. At the same time, the starting coil 31 is energized through contacts 26 and 27, switch 33, and contacts 23 and 24. Thus, the motor starts in what may be assumed to be a clockwise direction.

Concurrently with the energization of the winding 30, the coil 1 is energized and moves the plunger 2 to retracted position as shown in Figure 2, and thereby causes the settable element 10 to operate the beam 6 so as to latch the plunger 2 in retracted position and release the plunger 3. Both plungers then remain in their retracted positions as long as the coil 1 is energized. As soon as the motor reaches its normal operating speed, the centrifugal switch 33 opens, thus cutting out the starting winding 31 and the motor continues to be operated in a clockwise direction by winding 30.

If the motor should happen to stall, the centrifugal switch 33 recloses and the boosting power of the starting winding 31 is added to the torque produced by the winding 30. If the push-button is operated to open the switch 32 to stop the motor, the winding 30 and the coil 1 are immediately deenergized. When this occurs, the plunger 3, which has been released, is returned to extended position by the return spring 4, the plunger 2 remaining latched in retracted position. This movement of the plunger 3 moves the actuator 14 to the right as shown in Figure 1 to a position in which it breaks contact between contacts 23 and 24 and contacts 26 and 27 and establishes and maintains contact between the contacts 22 and 24 and contacts 25 and 27. Thus, a new circuit is set up to the starting winding 31 by which the leads from the source of power to the winding 31 have been reversed.

Also, the centrifugal switch has closed so that the starting winding 31 is established in a circuit such that, upon reclosure of the switch 32 for starting the motor, the starting winding 31 will be energized so as to cause the motor to start in the counter-clockwise direction. The switch 33, of course, again opens after the motor has come up to speed in the counter-clockwise direction.

The reclosure of the switch 32, however, energizes the coil 1 and upon energization thereof, the plunger 3 which has been unlatched and in extended position, moves to retracted position and operates the latching mechanism to unlatch the plunger 2, the plungers being held in this retracted position until the switch 32 opens again for the second time. When the switch 32 is opened for the second time, the plunger 2 is again released and moves to extended position and the plunger 3 remains latched in retracted position, whereupon the plunger 2 moves to the extended position under the influence of the return spring 4 and moves the actuator 14 so as to reestablish the starting circuit originally described.

It is apparent, therefore, that upon such complete cycle, including the closing of the switch 32, the starting of the motor, and the opening of the switch 32, there is established a circuit which will start the motor in the reverse direction upon the next closure of the switch 32.

It is to be noted also that the starting circuits, and all closures of the cooperating contacts 22 through 27, and all breaks of such contacts, are made while these contacts are disconnected from the source of power. This eliminates arcing and oxidation of the contacts.

In some instances, it is desirable to have the motor automatically reverse in case it becomes stalled. Such an application of device would be in connection with household garbage disposal units in which the grinding mechanism is jammed quite frequently by bones, tableware and other objects. Usually such grinding units are arranged with a rotary element which grinds in either direction of rotation, thus, in operating effect, having a throat at one side for clockwise grinding and another throat at the opposite side for counter-clockwise grinding. Consequently, if the rotary element can be reversed, foreign objects jammed in one throat can be removed from the one throat and transferred to the other for grinding merely by reversing the direction of rotation of the rotary element. If, the object then jams in the second throat, the rotary element can be reversed a second time, thus transferring the object back to the first throat. Thus the object can be transferred from throat to throat by successive reversals of the rotary element and ground in each direction of rotation until it is reduced sufficiently to pass properly through one of the throats. The most effective manner of controlling the direction of rotation of the rotary element is by reversing the driving motor of the element each time the element jams. Accordingly, the motor used is the one heretofore described and includes the running winding 30, the starting winding 31, the switch 32 and the centrifugal cut-out switch 33.

Figure 6:
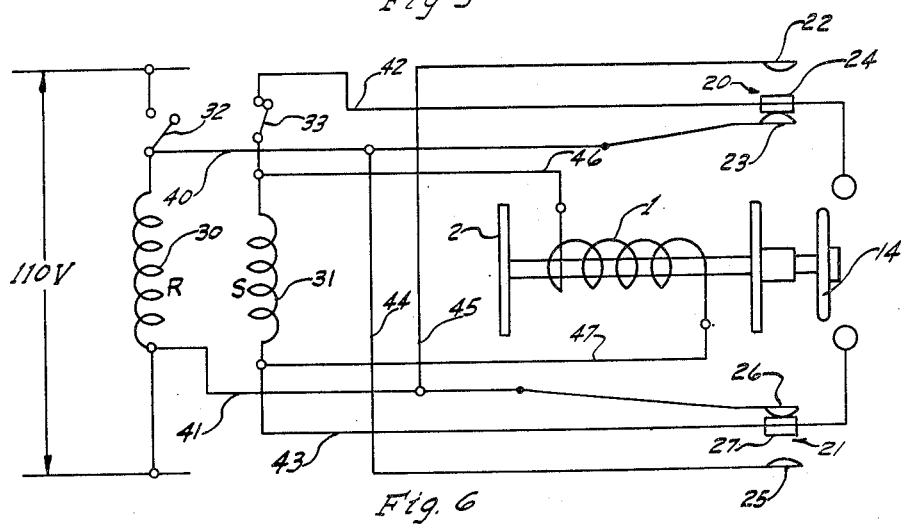
Figure 6 is another wiring diagram showing a second application of the device.

In order to make the motor automatically reversible, the circuit illustrated in Figure 6 is used. This circuit is as follows:

The running winding 30 is connected at one terminal to the contact 23 through a conductor 40 and the other terminal of the winding 30 is connected to the contact 26 by the conductor 41. The starting winding has one terminal connected to one terminal of the centrifugal cut-out switch 33 as heretofore described. The other terminal of the switch 33 is connected to the contact 24 by conductor 42 and the other terminal of the winding 31 is connected to the contact 27 by the conductor 43. That terminal of the running winding 30 connected to the contact 23 is also connected to the contact 25 by a conductor 44. The other terminal of the running winding 30 which is connected to the contact 26 is also connected to the contact 22 by a conductor 45. Opposite terminals of the starting winding 31 are connected to opposite terminals of the coil 1 by conductors 46 and 47, respectively.

It is apparent that in this circuit, the coil 1 can be energized only when the switches 32 and 33 are closed so that the starting winding 31 is energized. Opening of either switch 32 or 33 deenergizes both the starting winding 31 and the coil 1.

Let it be assumed, as in Figure 5, that the contacts 23 and 24 and the contacts 26 and 27 are closed. The plunger 3 is in retracted position so that the actuator 14 is to the left, the switch 32 is open and since the motor is not running, the switch 33 is closed. In this condition, it is assumed that the motor is set up for operating in a clockwise direction.

Upon closure of the switch 32, the running winding 30 is energized, as also is the starting winding 31, the latter being energized through conductor 40, contacts 23 and 24, conductor 42 and switch 33 to one terminal and through conductor 41, contacts 26 and 27 and conductor 43 to the other terminal. Thus, the motor is started in a clockwise direction and concurrently therewith, since the switch 33 is still closed, the coil 1 is energized.

The motor starts running in a clockwise direction and the plungers are drawn to retracted position by the coil 1 and the plunger 2 operates the latch mechanism, to latch the plunger 2 in retracted position and to release the plunger 3. This condition continues until the motor has come up to speed. When the motor reaches running speed, the centrifugal switch 33 opens. Thereupon, the starting winding 31 and the coil 1 are deenergized. The plunger 2 is held in retracted position and the plunger 3 is returned to extended position by the return spring 4 and in returning, opens the contacts 23 and 24 and contacts 26 and 27 and closes the contacts 22 and 24 and contacts 25 and 27. This action reverses the circuit to the starting winding 31 so that when the switch 33 is again closed, power will be supplied to the starting winding 31 at the terminals opposite from what it was applied originally. Consequently, upon jamming of the motor and resultant closing of the switch 33, the motor is restarted in the reverse direction.

Assume, therefore, that the motor stalls because of some foreign object jamming the grinding mechanism, stopping of the motor causes the centrifugal starting switch 33 to close but since a reversing circuit has already been established, closure of the switch 33 causes the starting winding 31 to start the motor in the opposite direction. At the same time, it energizes the coil 1 so as to retract the plunger 3 and operate the latch to release the plunger 2. Again when the motor has come up to speed in the reverse direction, the switch 33 opens, deenergizing the coil 1 and the winding 31, the plunger 2 returns to extended position, moving with it the actuator 14 so as to break the circuit between contacts 22 and 24 and contacts 25 and 27 and reestablish the circuit between the contacts 23 and 24 and contacts 26 and 27.

Obviously, if the switch 32 should be open for any purpose while the switch 33 is closed, it would have the same effect on the operation on the selecting device as would the opening of the switch 33.

Figure 7:
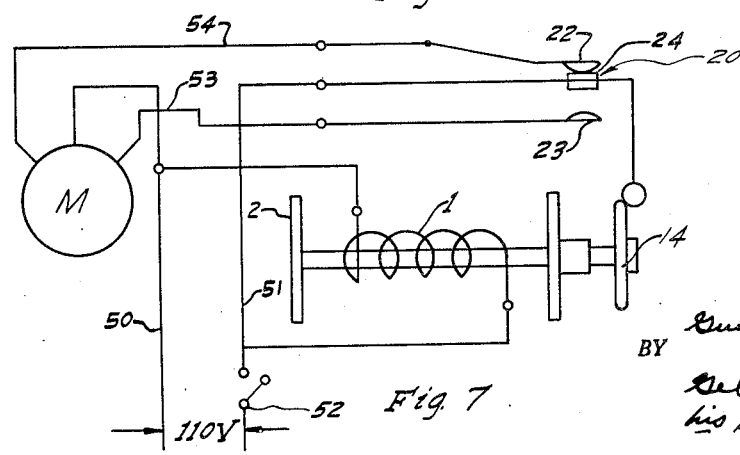
Figure 7 is a wiring diagram showing a third application of the device.
Figure 8:
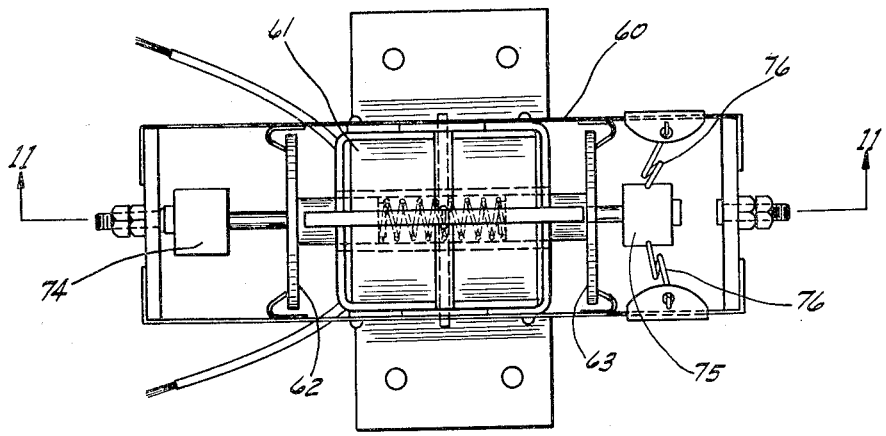
Figures 8, 9 and 10, are, respectively, a top plan view, front elevation, and right end elevation of a modified form of the device, a part of Figure 8 being shown in section for clearness in illustration.
Figure 9:
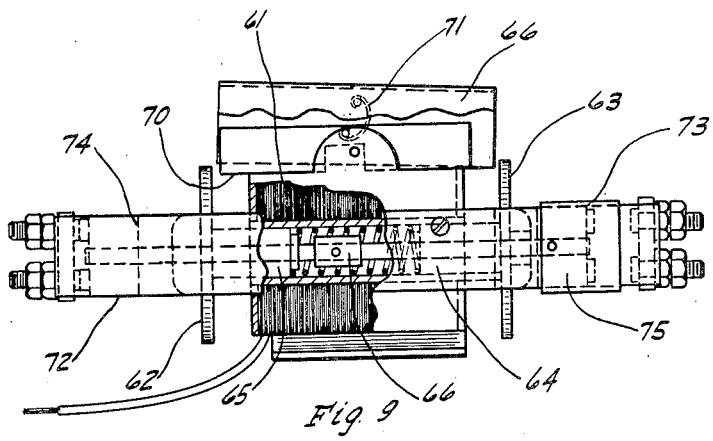
Figure 10:
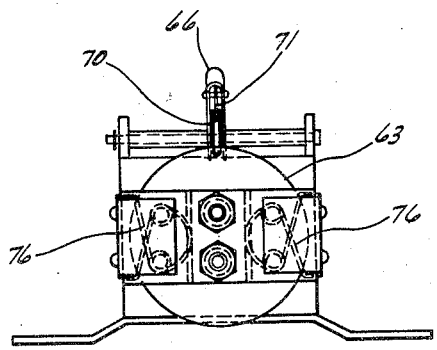
Figure 11:
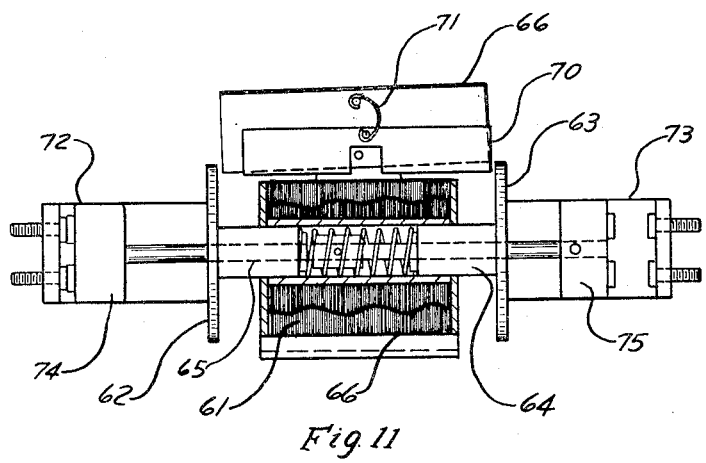
Figure 11 is a longitudinal sectional view partly in elevation taken on the line 11—11 of Figure 8.

In Figure 7, the device is shown as connected for use in a three-wire motor system in which the motor can be reversed by reversal of certain connections. For such a system, only one of the switches, for example, the switch 20 is used. The motor is connected to the source through suitable conductors 50 and 51, a switch 52 being interposed in the conductor 51 between the motor and the source. The conductor 51 is connected to the movable contact 24 of the device. The other conductors 53 and 54 of the motor are connected to the contacts 22 and 23 of the switch 20, respectively. The coil 1 is connected across the conductors 50 and 51 between the motor and the switch 52 so that it is energized when the switch 52 closed and unenergized when the switch 52 is open. The direction of operation of the motor depends upon whether the circuit is established through contacts 23 and 24 or through contacts 22 and 25 and obviously, the device operates in the same manner heretofore described upon complete cycles, each of which cycles includes a closing and an opening of the switch 52.

Referring next to the modifications illustrated in Figures 8 through 11, the selective mechanism has essentially the same parts but they are arranged in the reverse fashion such that when the coil is energized, one only of the plungers can move to retracted position, the other being latched in extended position and when the coil is deenergized, both plungers move to extended position. In this modification, contact is made and broken while the coil of the selective device is energized. Since the mechanism or motor to be operated depends for operation on energization of the circuit, the selective device will make and break contact when the circuit to that motor is energized. Thus, the modification sets up a circuit which is complete except for the switch of the motor and it breaks the circuit while the circuit is fully energized.

Referring, therefore, to Figures 8 through 11, the device comprises essentially the same parts as in the form heretofore described in Figures 1 through 4 except as mentioned, that the parts are arranged to operate in a reverse manner.

In this form, indicated generally at 60, the coil 61 urges the plungers 62 and 63 to retracted position and a return spring 64 urges the plungers 62 and 63 relatively apart to extended positions. The plungers 62 and 63 accommodate a shaft or rod 65 which is slidable relative to each and which is provided at its mid-portion with a block or abutment 66 which is in fixed relation to the rod 65 axially thereof. The ends of the abutment 66 are so spaced from the adjacent ends of the plungers 62 and 63 as to provide a lost motion operating connection between the plungers and the rod for moving the rod axially in opposite directions by the plungers. Thus, when the plunger 62 is moved to its retracted position, its inner end engages the corresponding end of the block 66 and moves the rod 65 to the right in Figures 8 and 9. Correspondingly, when the plunger 63 is moved to its retracted position, it engages the adjacent end of the block 66 and moves the rod to the left.

The latching element 66 is somewhat modified in that it is arranged to latch one plunger in the extended position while permitting the other plunger to move toward retracted position in one position of the latch element and to release the said other plunger in extended position and permit said one plunger to move to retracted position in another position of the latch element. In other respects, it operates in the same manner as the latch element 6 by means of its settable element 70 and spring 71. Thus, whereas, in the original form the latch cooperated with the plungers to control their return movement under the influence of the return spring, in the form in Figures 8 through 10, it operates to control the movement of the plungers by the solenoid toward retracted position. The rod 65 is provided at each end with switches 72 and 73, each of which, when closed, is operable to complete a different circuit. The switch 72 is provided with a movable contact element 74 and the switch 73 is provided with a movable contact element 75, the contact elements 74 and 75 being fixedly secured on the rod 65. Suitable dead center springs 76 are connected to the frame of the device and to one of the movable contact elements, such as 75, and are operable to snap in whichever direction it is moving when it passes a dead center position of the spring, thus effecting a snap action make and break contact of both movable contact elements 73 and 74.

While I have described a preferred embodiment of the invention and a modification thereof and a number of structures in which it may be combined usefully, it is to be understood that the examples given are for purposes of illustration and not in limitation of the scope of the invention and that other modifications of the structure and other uses therefor may be made without departing from the scope of the invention as defined in the appended claims.

Having thus described my invention, I claim:

1. A selective device for the purposes described comprising a pair of members movable in a direction relatively toward, and in a direction relatively away from, each other, respectively, a rocking beam, said beam having latching means at opposite sides of its rocking axis operable when the beam is depressed at one end to latch one of the members against movement in a predetermined direction and release the other of the members, and operable when the beam is depressed at the other end to latch said other of the members against movement in an opposite direction and to release said one of the members, a settable means settable relative to the rocking beam by whichever member is unlatched, and operable, when so set, to rock the beam into releasing position relative to the then latched member and into latching position relative to the then unlatched member, all upon movement of the members through at least a portion of their cycle and said settable means being settable and, by the member which was released by the preceding rocking movement of the beam to rock the beam to releasing relation to the member latched by the said preceding rocking movement of the beam and into latching relation to the member released by said preceding rocking movement of the beam all upon the next succeeding movement of the members through at least a portion of their cycle, means to move said members in a preselected one of said relative directions, and resilient return means urging said members in the other of said relative directions.

2. A selective device according to claim 1 characterized in that said settable means includes an element which is floatingly mounted in the beam for movement concurrently transversely and lengthwise of the beam, and has shoulders engageable by the members, respectively, each in a different rocked position of the beam, for moving the settable element lengthwise of the beam when the members are moved in said one of the relative directions, and spring means is provided and resiliently urges the settable element transversely of the beam in all positions of the element.

3. A selective device according to claim 2 characterized in that the latching means are shoulders at the opposite sides of the rocking axis of the beam, respectively, and engageable with the members, respectively, in latching relation thereto, and the settable element is resiliently held in a position by a spring such that when the settable element is moved endwise of the beam by which ever member is unlatched, it engages a part of the device near the latched member and is deflected thereby transversely of the beam so as to engage and rock the beam at the latched end and thereby disengage the shoulder from the member at the latched end and concurrently lower the end of the beam at the unlatched end so that the shoulder at the unlatched end engages and latches the member at the unlatched end.

4. An actuating device comprising a solenoid coil, a pair of plungers mounted therein for axial movement independently of each other relative thereto and in a direction relatively toward, and in a direction relatively away from, each other, respectively, said plungers being movable in one of said directions by the coil, when the coil is energized, to one position, resilient means urging the plungers in the other of said directions, a latch element mounted for movement to two latching positions in one of which latching positions it is in latching relation to one of the plungers and out of latching relation to the other of said plungers, when the plungers are in their said one position, and in the other of which latching positions it is in latching relation to said other of said plungers and out of latching relation to said one of said plungers when the plungers are in their said one position, a settable element operatively connected to the latch element and movable relative thereto and being engageable and movable, when the plungers are moved by the coil toward their said one position, by whichever plunger is then unlatched to shift the latch element out of latching relation to whichever plunger is then latched and into latching relation to the plunger which is unlatched, whereby the plungers are released alternately in relation to successive de-energizations of the coil.

5. A selecting mechanism comprising a support, a pair of members mounted thereon for movement relative thereto, independently of each other respectively, in one cycle, in a direction toward and away from each other, resilient means urging the members in one of said directions, solenoid means operable when energized to move the members in the other of said directions, a latch device operable in one setting to latch one member in one position and release the other member and operable in another setting to latch said other member in another position and release said one member, a settable element rendered operative by said other member upon movement of said other member through at least a predetermined portion of its cycle to operate the latch to release said one member and latch said other member, and rendered operative by said one member upon movement of the one member through at least a predetermined portion of its cycle to said one position to operate the latch to release said other member and latch said one member in said one position, resilient means to move said members out of their said positions, respectively, when the members are released, an actuator operatively connected to the members and movable to one position by said one member upon movement of said one member in one of its directions, and movable to another position by said other member upon movement of the other member in one of its directions.

6. A device according to claim 5 characterized in that the connection between the actuator and members is a lost motion connection.

7. In an electric circuit including a double throw switch operable in one closed position to effect a predetermined energization of a device and in another closed position to effect different predetermined energization of the device and a control switch for connecting the circuit across the source of power; a mechanism for reversing the position of the double throw switch each time the control switch is operated, said mechanism comprising a support, a pair of elements movable independently of each other relative to the support, a solenoid coil member adapted to be connected to said circuit for energization thereby when the circuit is energized, means, operated by the coil member when the coil member is energized, for moving the elements in one direction relative to each other, a resilient return member normally urging the elements in a direction opposite from that in which moved by the coil member, whereby the elements are moved to a predetermined position by one of the members, a latch arranged to latch one element while they are in said position and concurrently release the other element and to latch the other element while they are in said position and concurrently release the one element, selectively, means cooperable with the elements and movable by whichever one of them is unlatched when they are moved into said predetermined position to render the latch operative to latch the then unlatched one and to release the then latched one, means connected to the double throw switch and operated by one of the elements while said one is unlatched to close the switch for one of said energizations, and operated by the other of the elements, while the said other is unlatched, to reversely close the switch for the other energization.

8. In a system including a circuit, a switch for opening and closing the circuit, a motor having a running winding in the circuit, a directional control comprising a solenoid coil member in the circuit, a double throw reversing switch operative in one closed position to connect the circuit to an electrical reversing device so as to cause the motor to operate in one direction and operable when in another closed position to connect the circuit to said device so as to cause the motor to operate in the opposite direction, an actuator operable when moved to one position to move the switch to said one closed position and when moved to another position to move the switch to another closed position, movable means movable by the coil member in one direction when the coil is energized, a return member for returning the movable means in an opposite direction when the coil member is unenergized, whereby the movable means is moved to a predetermined position by one of the members, latch means for causing the movement of the movable means from said predetermined position to two other positions, settable means for alternating the movement of the movable means to said two other positions in relation to successive cycles of energization of the coil member, means operatively interconnecting the movable means and actuator for moving the actuator to its said positions, in said response to said alternate movements of the movable means, respectively.

9. In an electrical circuit including a master switch for connecting and disconnecting the circuit to and from a source of power, a double throw switch for applying the power from the circuit differently, in accordance with the closed positions of the double throw switch, a solenoid coil connected to said circuit for energization when the master switch is closed, a pair of movable members movable by the coil to one position when the coil is energized, each movable member having an operating position, resilient means operative for returning each member to its operating position from said one position when the coil is deenergized, latch means operable in one operated position of the latch to latch one of the members against return to its own operating position and to release the other for return to its own operating position, and in another operated position of the latch to latch said other of the members against return to its own operating position and to release said one for return to its own operating position, settable means operated by movement of the members to said one position to select the operated positions of the latch means in alternate relation to each other for successive energizations of the coil, connecting means connecting the double throw switch and members for moving the double throw switch to one of its closed positions upon return of one of the members to its own operating positions and for moving the double throw switch to the other of its closed positions upon return of the other members to its own operating position, and a lost motion connection between each member and the connecting means.

10. A control for a reversibly operable motor having an operating winding and a reversible starting winding, a circuit connected to the windings, an operating winding switch for connecting the circuit across a source of power, a starting winding switch, a reversing switch in the circuit and when the circuit is energized, operative in one position to connect said starting winding in the circuit for starting the motor in a forward direction and in another position to connect said starting winding in the circuit for starting the motor in a reverse direction, an actuating coil connected in the circuit for energization thereby when power is being supplied to one of the windings, actuating means operable by each cycle of energization and deenergization of the coil, operated by successive cycles so as to be moved to two preset positions, alternately, and means operated by the actuating means when the actuating means is moved to either of said preset positions to reverse the setting of the switch from what it was set by the actuating means when the actuating means was in the immediately preceding preset position.

11. A control according to claim 10 characterized in that said one of the windings is the starting winding and the coil is connected in the circuit in series with the starting winding switch.

12. A control according to claim 11 characterized in that said starting winding switch is a normally closed centrifugal switch which opens centrifugally.

13. A control according to claim 10 characterized in that said winding is the operating winding and said coil is connected for energization whenever the running winding is energized.

14. A control for a double throw switch and comprising a solenoid coil, movable means movable to a predetermined position by the coil when the coil is energized, resilient means operable for returning the movable means to two different operating positions when the coil is deenergized, settable means operated by the movable means when the movable means is moved to said predetermined position by the coil to cause the movable means to return alternately to said operating positions for successive operations of the coil, means operable by the movable means when the movable means returns to one of said operating positions to reverse the closure of the switch from what it was prior to said return, and when the movable means returns to the other operating position, to reverse the closure of the switch from what it was set by the movable means when the movable means returned to the said one position.

15. A switch mechanism for the purposes described comprising a reversible switch, a solenoid coil, a pair of plungers movable axially of the coil independently of each other and relatively toward each other to retracted positions, respectively, said plungers being moved by the coil relatively toward each other when the coil is energized and being unrestrained by the coil when the coil is unenergized, return means urging the plungers away from each other, latch means operable for holding a first one of the plungers latched in its retracted position and the second one unlatched concurrently, and for holding the second one latched in its retracted position and the first one unlatched, concurrently, settable means operated by one movement of the plungers when the plungers are moved to their retracted positions by the coil to release the latched first one of the plungers and to latch the unlatched second one of the other plungers, whereby upon deenergization of the coil, the first one of the plungers is returned to its extended position and, upon reenergization of the coil, operated by movement of the plungers when they are moved to their retracted positions, to release the then latched second one of the plungers and to latch the then unlatched first one of the plungers, connecting means operatively connected to the plungers for movement in one direction by one of the plungers at its return to its extended position and in the opposite direction by the other plunger when it returns to its extended position, to different positions, respectively, and operatively connected to the switch for effecting one closure of the switch upon movement to one of said positions for reversing the closure of the switch upon movement to the other of said positions.

16. A selective device for the purposes described and comprising movable members movable to a non-operating position and movable from the non-operating position to two different relative positions each of which is a different operating position, a latch, a settable device operated by at least one of the members each time the members move from either of said relative positions to said non-operating position to shift the latch so as to constrain the movable members from moving to the one of the relative positions from which it had moved for operating the latch and to permit them to move to the other one of the relative positions, means for moving the members to non-operating positions, and means for moving the members to said relative positions when permitted by the latch.

References Cited in the file of this patent

UNITED STATES PATENTS 2,661,450    Moler  ---------------- Dec. 1, 1953